United States Patent
Adema et al.

(10) Patent No.: US 12,437,687 B2
(45) Date of Patent: Oct. 7, 2025

(54) ALIGNMENT OF WAVEGUIDE AND DISPLAY IN SMARTGLASSES

(71) Applicant: Google LLC, Mountain View, CA (US)

(72) Inventors: Daniel Adema, Kitchener (CA); Shreyas Potnis, Kitchener (CA); Eliezer Glik, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/462,262

(22) Filed: Sep. 6, 2023

(65) Prior Publication Data

US 2024/0078944 A1 Mar. 7, 2024

Related U.S. Application Data

(60) Provisional application No. 63/374,773, filed on Sep. 7, 2022.

(51) Int. Cl.
*G09G 3/00* (2006.01)
*G02B 27/01* (2006.01)

(52) U.S. Cl.
CPC ......... *G09G 3/007* (2013.01); *G02B 27/0172* (2013.01); *G02B 2027/0121* (2013.01); *G02B 27/017* (2013.01); *G02B 2027/0178* (2013.01); *G09G 2320/0693* (2013.01)

(58) Field of Classification Search
CPC .......... G09G 3/007; G09G 2320/0693; G02B 27/0172; G02B 27/017; G02B 2027/0121; G02B 2027/0178
See application file for complete search history.

(56) References Cited

U.S. PATENT DOCUMENTS

| | | | |
|---|---|---|---|
| 10,319,266 B1 * | 6/2019 | Percival | G02B 27/0172 |
| 2019/0227319 A1 * | 7/2019 | Trail | G09G 3/002 |
| 2020/0278538 A1 * | 9/2020 | Taylor | G02B 27/0172 |
| 2022/0058997 A1 * | 2/2022 | Buckley | G02B 27/0172 |
| 2022/0413289 A1 * | 12/2022 | Mityashin | G02B 6/0035 |
| 2023/0036762 A1 * | 2/2023 | Hong | H04N 13/167 |

* cited by examiner

*Primary Examiner* — William Boddie
*Assistant Examiner* — Saifeldin E Elnafia
(74) *Attorney, Agent, or Firm* — Brake Hughes Bellermann LLP

(57) ABSTRACT

Improved techniques of detecting angular misalignment between a display and a waveguide of a smartglasses device includes providing a detection mechanism for the display such that the location of a misalignment can indicate how to compensate for the misalignment.

9 Claims, 10 Drawing Sheets

ALIGNMENT OF WAVEGUIDE AND DISPLAY IN SMARTGLASSES

CROSS REFERENCE TO RELATED APPLICATION

This application claims the benefit of U.S. Provisional Application No. 63/374,773, filed on Sep. 7, 2022, the disclosure of which is incorporated herein by reference in its entirety.

TECHNICAL FIELD

This description relates in general to head mounted wearable devices, and in particular, to head mounted wearable computing devices including a display device.

SUMMARY

Waveguides and displays are typically aligned at an angle such that no reflection from a waveguide incoupler is detected at the display. If there is a misalignment in angle, i.e., an angular deviation, then there will be a reflection on the display. Such a misalignment can occur when the smartglasses are dropped, for example. Herein is provided a detection mechanism for the display such that the location of a misalignment can indicate how to compensate for the misalignment. For example, at least some of the pixels of the display may have sub-pixels that act as light detectors. Alternatively, at least some of the pixels may have a read mode when light is not expected; in this case, the pixel emitters can be used as light detectors and can detect when light is incident upon reflection from a waveguide incoupler, e.g., not in the correct place. In any case, the detection of the light reflected from the incoupler provides the location of the light via the detecting pixel.

In one general aspect, a method includes emitting, from a first pixel of a plurality of pixels of a display of a smartglasses device, light toward an incoupler of a waveguide of the smartglasses device, the first pixel being designated as a reference point for alignment calibration. The method also includes detecting, from a second pixel of the plurality of pixels, light reflected from the incoupler of the waveguide. The method further includes determining a misalignment between the display and the waveguide based on an offset between the first pixel and the second pixel. The method further includes shifting the plurality of pixels based on the misalignment.

In another general aspect, a computer program product comprising a nontransitory storage medium, the computer program product including code that, when executed by processing circuitry, causes the processing circuitry to perform a method, the method including emitting, from a first pixel of a plurality of pixels of a display of a smartglasses device, light toward an incoupler of a waveguide of the smartglasses device, the first pixel being designated as a reference point for alignment calibration. The method also includes detecting, from a second pixel of the plurality of pixels, light reflected from the incoupler of the waveguide. The method further includes determining a misalignment between the display and the waveguide based on an offset between the first pixel and the second pixel. The method further includes shifting the plurality of pixels based on the misalignment.

In another general aspect, an apparatus includes memory and processing circuitry coupled to the memory. The processing circuitry is configured to emit, from a first pixel of a plurality of pixels of a display of a smartglasses device, light toward an incoupler of a waveguide of the smartglasses device, the first pixel being designated as a reference point for alignment calibration. The processing circuitry is also configured to detect, from a second pixel of the plurality of pixels, light reflected from the incoupler of the waveguide. The processing circuitry is further configured to determine a misalignment between the display and the waveguide based on an offset between the first pixel and the second pixel. The processing circuitry is further configured to shift the plurality of pixels based on the misalignment.

The details of one or more implementations are set forth in the accompanying drawings and the description below. Other features will be apparent from the description and drawings, and from the claims.

DETAILED DESCRIPTION

Figure 1A:
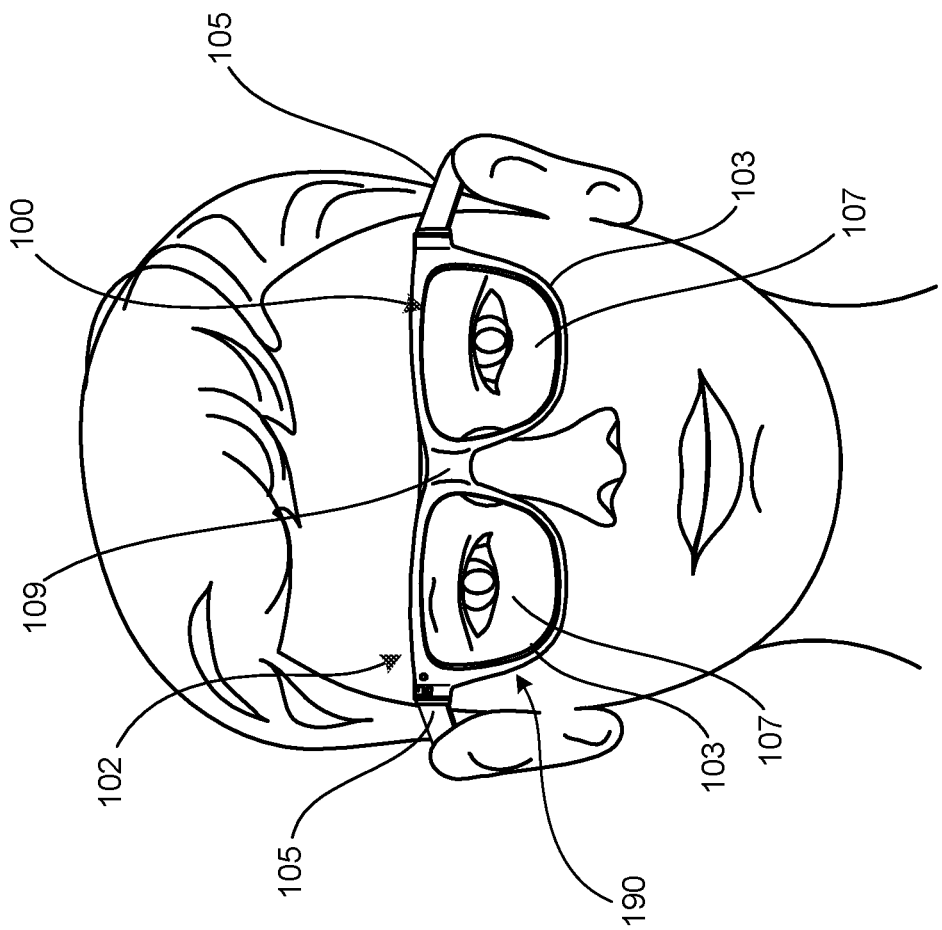
FIG. 1A illustrates an example system, in accordance with implementations described herein.

Eyewear in the form of glasses may be worn by a user to, for example, provide for vision correction, inhibit sun/glare, provide a measure of safety, and the like. These types of eyewear are typically somewhat flexible and/or deformable, so that the eyewear can be manipulated to comfortably fit the user. An ophthalmic technician can typically manipulate rim portions and/or temple arm portions of a frame of the eyewear, for example, through cold working the frame and/or heating and re-working the frame, to adjust the eyewear for a particular user. In some situations, this re-working of the frame may occur over time, through continued use/wearing of the eyewear by the user. Manipulation in this manner, due to the flexible and/or deformable nature of the material of the frame and/or lenses of the eyewear, may provide a comfortable fit while still maintaining ophthalmic alignment between the eyewear and the user. In a situation in which the eyewear is a head mounted computing device including a display, such as, for example, smart glasses, this type of flexibility/deformation in the frame may cause inconsistent alignment or the display, or misalignment of the display. Inconsistent alignment, or misalignment of the display can cause visual discomfort, particularly in the case of a binocular display. A frame having rigid/non-flexible components, while still providing some level of flexibility in certain portions of the frame, may maintain alignment of the display, and may be effective in housing electronic components of such a head mounted computing device including a display.

This disclosure relates to mechanisms for eyewear in augmented or mixed reality (AR/MR) that ensure alignment of waveguides and displays. Waveguides and displays are typically aligned at an angle such that no reflection from a waveguide incoupler is detected at the display. If there is a misalignment in angle, i.e., an angular deviation, then there will be a reflection on the display. Such a misalignment can occur when the smartglasses are dropped, for example.

A technical problem with current smartglasses is that there is no mechanism for detecting such misalignment as the display is not naturally set up to detect light.

A technical solution to the technical problem includes providing a detection mechanism for the display such that the location of a misalignment can indicate how to compensate for the misalignment. For example, at least some of the pixels of the display may have sub-pixels that act as light detectors. Alternatively, at least some of the pixels may have a read mode when light is not expected; in this case, the pixel emitters can be used as light detectors and can detect when light is incident upon reflection from a waveguide incoupler, e.g., not in the correct place. In any case, the detection of the light reflected from the incoupler provides the location of the light via the detecting pixel.

A technical advantage of the above-described technical solution is that accidental droppage of smartglasses may not render the smartglasses misaligned.

Figure 1B:
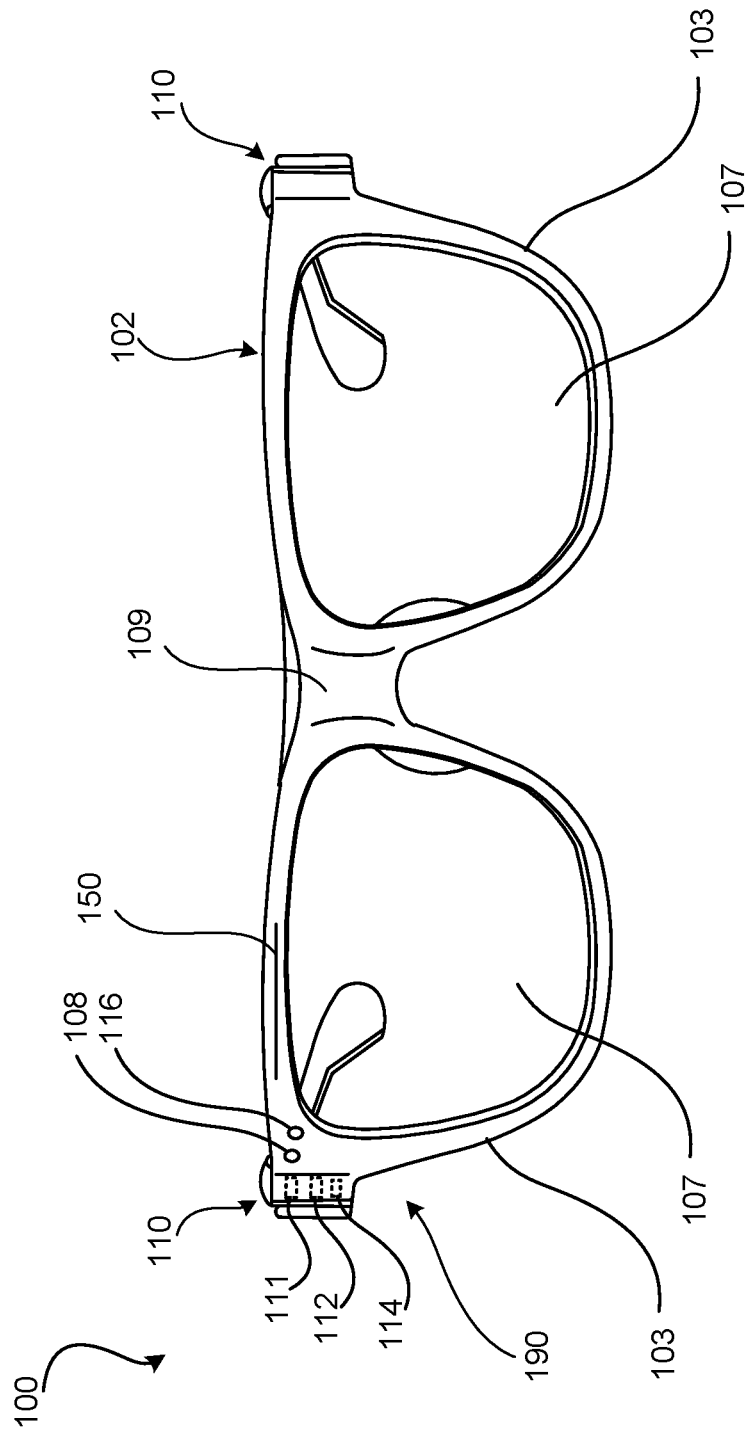
FIG. 1B is a front view.
Figure 1C:
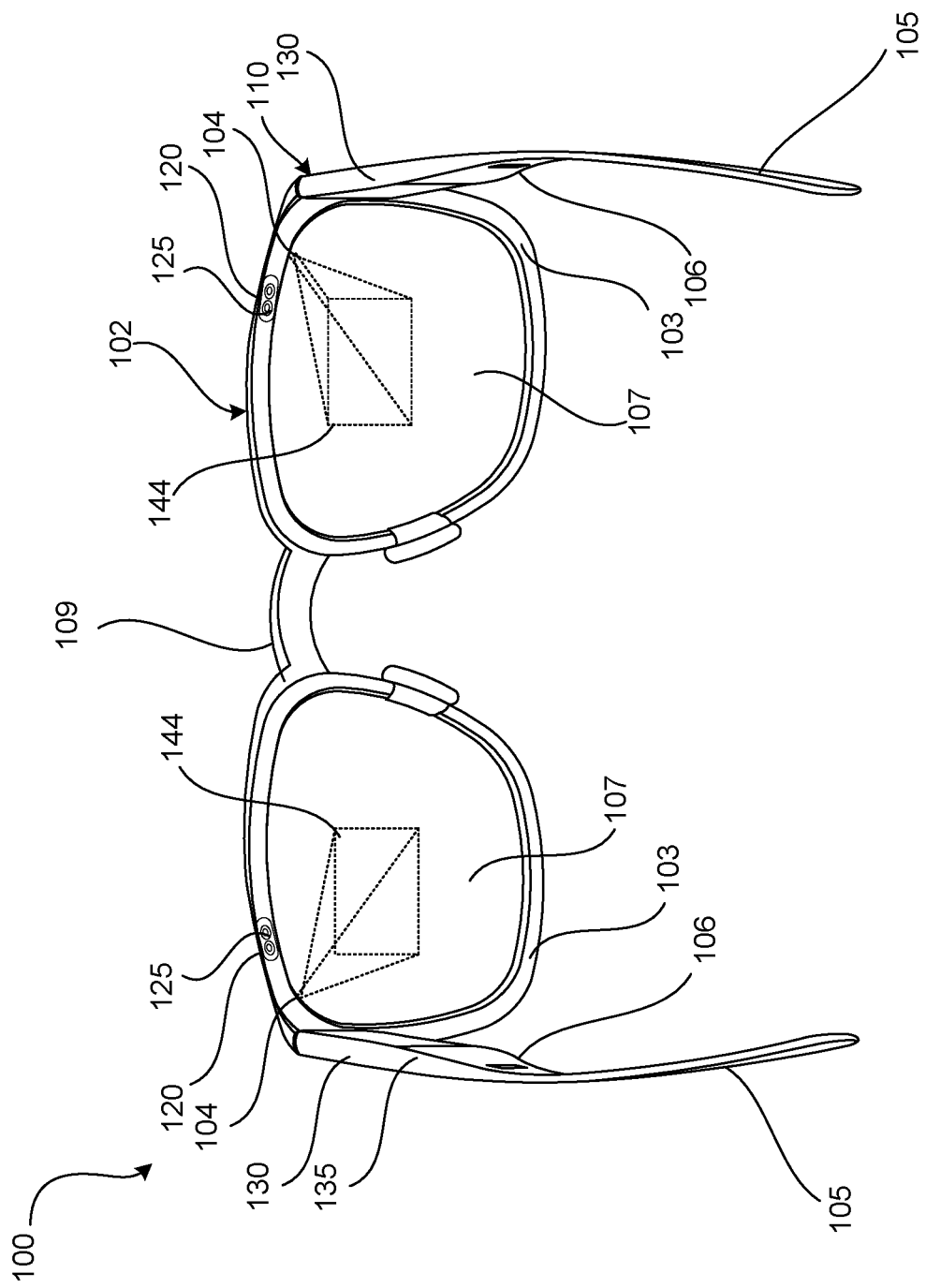
FIG. 1C is a rear view.
Figure 1D:
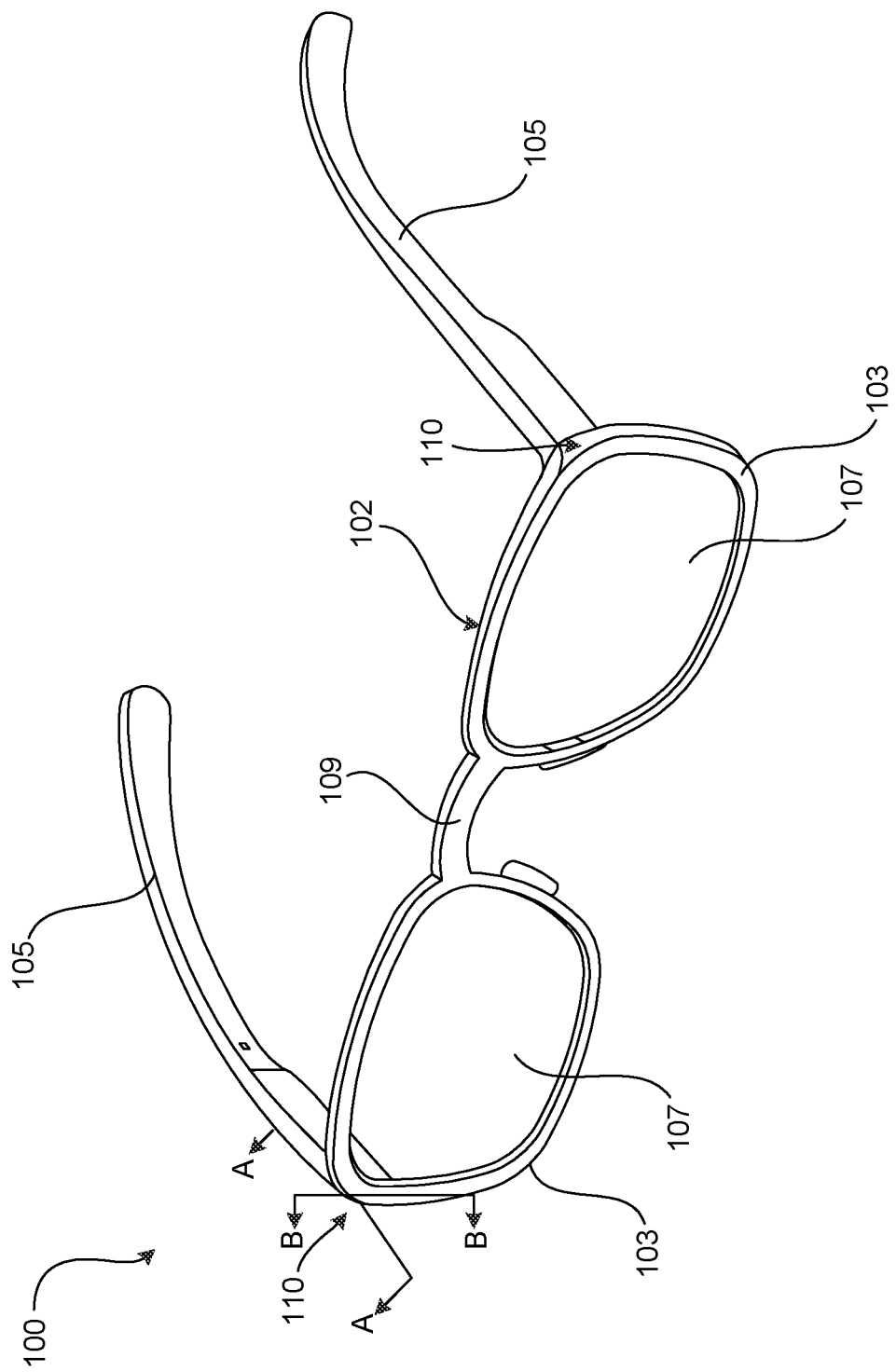
FIG. 1D is a perspective view, of the example head mounted wearable device shown in FIG. 1A, in accordance with implementations described herein.

FIG. 1A illustrates a user wearing an example head mounted wearable device 100. In this example, the example head mounted wearable device 100 is in the form of example smart glasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smart glasses, or augmented reality glasses.

As shown in FIG. 1B-1D, the example head mounted wearable device 100 includes a frame 102. The frame 102 includes a front frame portion defined by rim portions 103 surrounding respective optical portions in the form of lenses 107, with a bridge portion 109 connecting the rim portions 109. Arm portions 105 are coupled, for example, pivotably or rotatably coupled, to the front frame by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters. A display device 104 may be coupled in a portion of the frame 102. In the example shown in FIGS. 1B and 1C, the display device 104 is coupled in the arm portion 105 of the frame 102. In some examples, the head mounted wearable device 100 can also include an audio output device 106 (such as, for example, one or more speakers), an illumination device 108, a sensing system 111, a control system 112, at least one processor 114, and an outward facing image sensor 116, or camera 116. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104 via outcoupled light 120.

Waveguide optics 150 within the frame 102 are used to depict content on the display device 104. Such waveguide optics may be sensitive to the frame deformations resulting in real and virtual images that may become misaligned. Given the sensitivity of the waveguide optics 150 to frame deformations, a novel way to align real and virtual images in the display 104 is to reroute incident light from the projector onto an incoupler of the waveguide 150 such that the output light direction (e.g., light output by the waveguide outcoupler) is essentially parallel (e.g., to within 0.5 degrees or less) to the incident (input) light direction. Such a way involves the use of an input light direction retroreflector configured to adjust an initial angle of incidence of the internally generated radiation at a surface of the waveguide 150 to produce radiation directed at an adjusted angle of incidence at an incoupler such that the output direction is essentially parallel to the initial angle of incidence.

In some implementations, the waveguide 150 and the display device 104 may not be aligned. In this case, the at least one processor 114 may be used to detect the effect of reflections from the incoupler of the waveguide onto the display, e.g., in terms of where the reflected light is detected on the display or what the distribution of light is on the display as a result of the reflection. The at least one processor may also be used to compensate for any misalignment indicated by the reflected light, e.g., from light reflected to a pixel different from the pixel that emitted the light.

Figure 2:
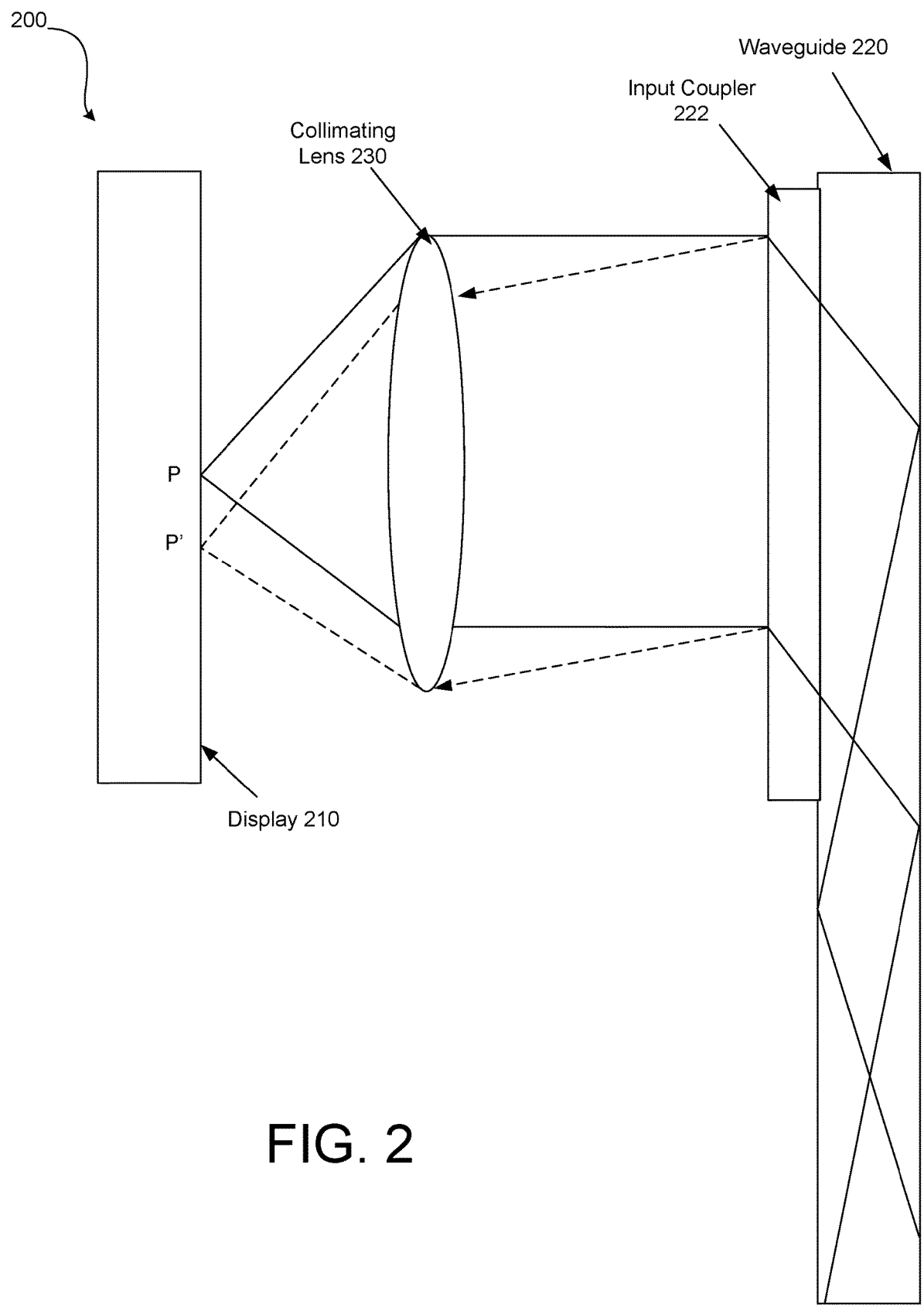
FIG. 2 is a diagram illustrating a misalignment of the display and waveguide.

FIG. 2 is a diagram illustrating a misalignment of the display 210 and waveguide 220. As shown in FIG. 2, the display 210 emits light at pixel P. The light propagates to collimating lens 230, from where it is normally incident on the input coupler 222 of waveguide 220. If the display 210 and waveguide 220 are correctly aligned, any reflection will follow the same path back to the display at P and any reflection is then not observed. In contrast, if there is misalignment between display 210 and waveguide 220, then a reflection of light off the incoupler 222 will follow the dashed path, which deviates from the emitted path, back to point P' on the display. Accordingly, it is desired that there be a detection mechanism at point P', or any point on the display 210 where a misalignment reflection may be incident.

The points P and P' on the display may correspond to pixels on the display. In some implementations, some pixels on the display are configured to emit light while others are configured to detect light. In this case, a fixed test pattern may be illuminated that would indicate alignment if the detecting pixels are illuminated, and misalignment if the detecting pixels are not illuminated. The testing of the alignment between the display and the waveguide may be performed periodically, e.g., hourly, daily, weekly, etc. Such a situation, however, may interfere with the user experience.

Rather than having fixed locations on the display for detecting illumination, in some implementations, each pixel in the display is configured to emit and detect light. In this case, misalignment may be detected not just by a fixed test pattern, but in everyday use. This is shown with respect to FIGS. 3A, 3B, and 3C.

Figure 3A:
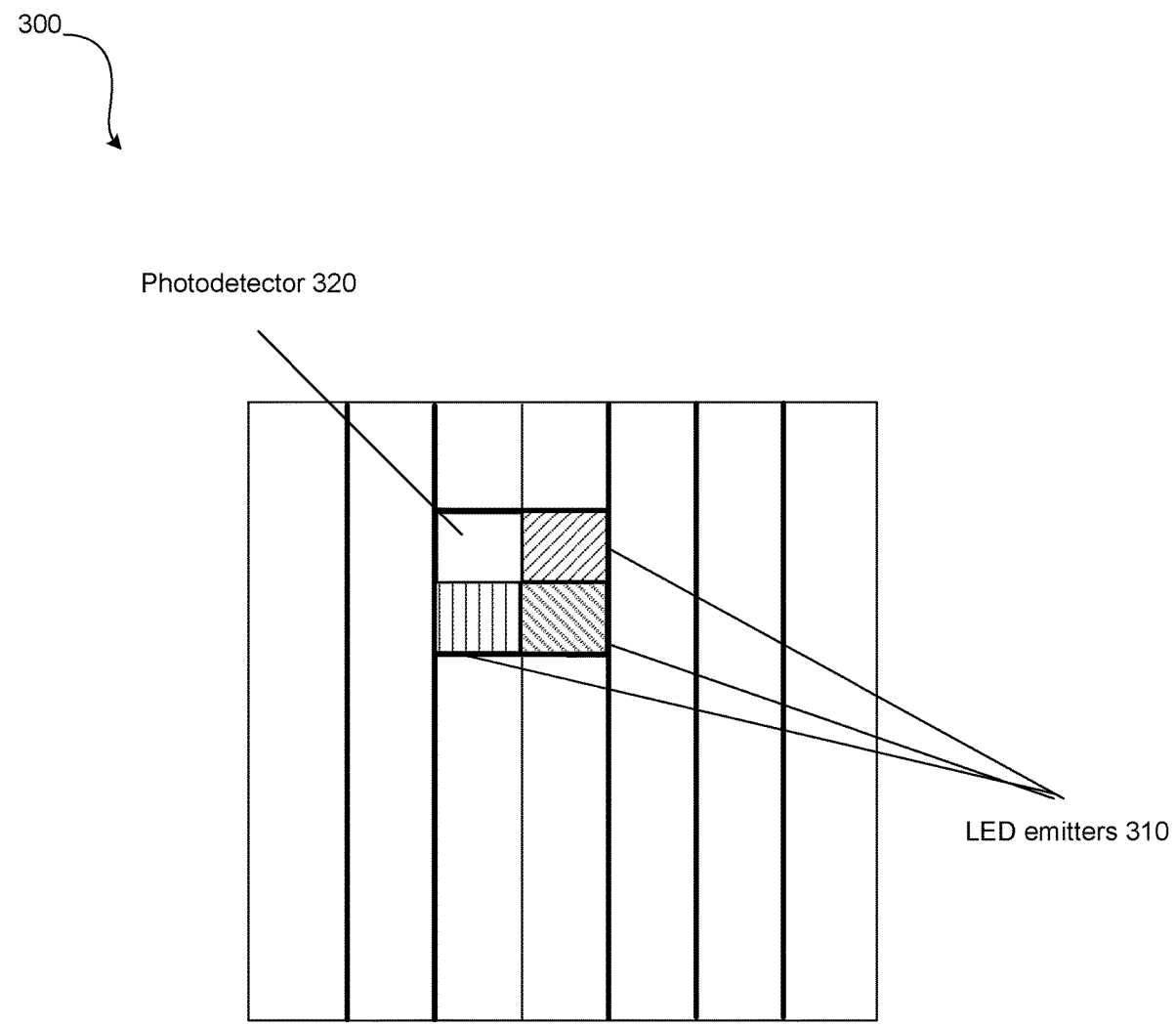
FIGS. 3A, 3B, 3C are diagrams illustrating detection schemes for detecting misalignment between the display and waveguide.
Figure 3B:
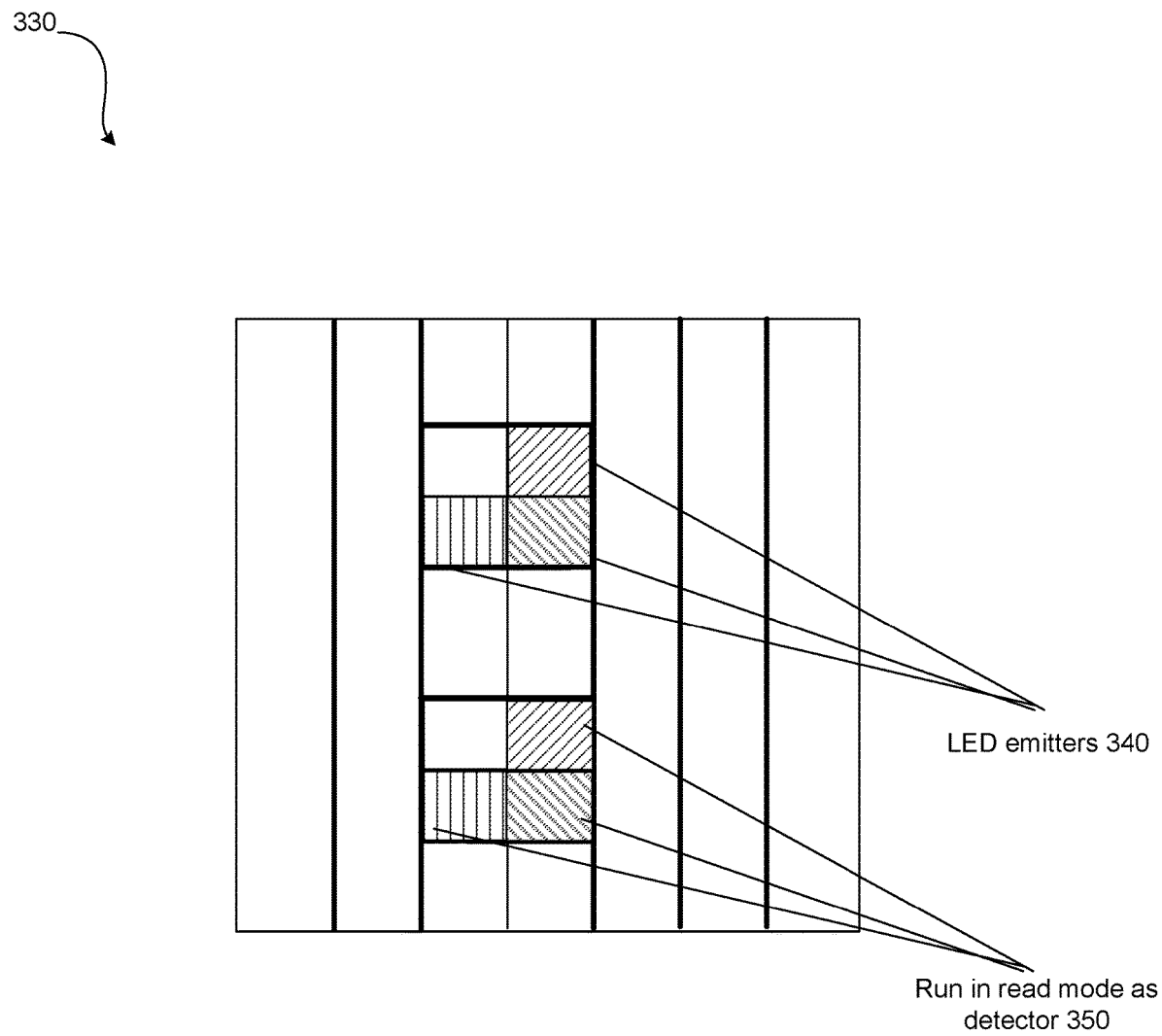
Figure 3C:
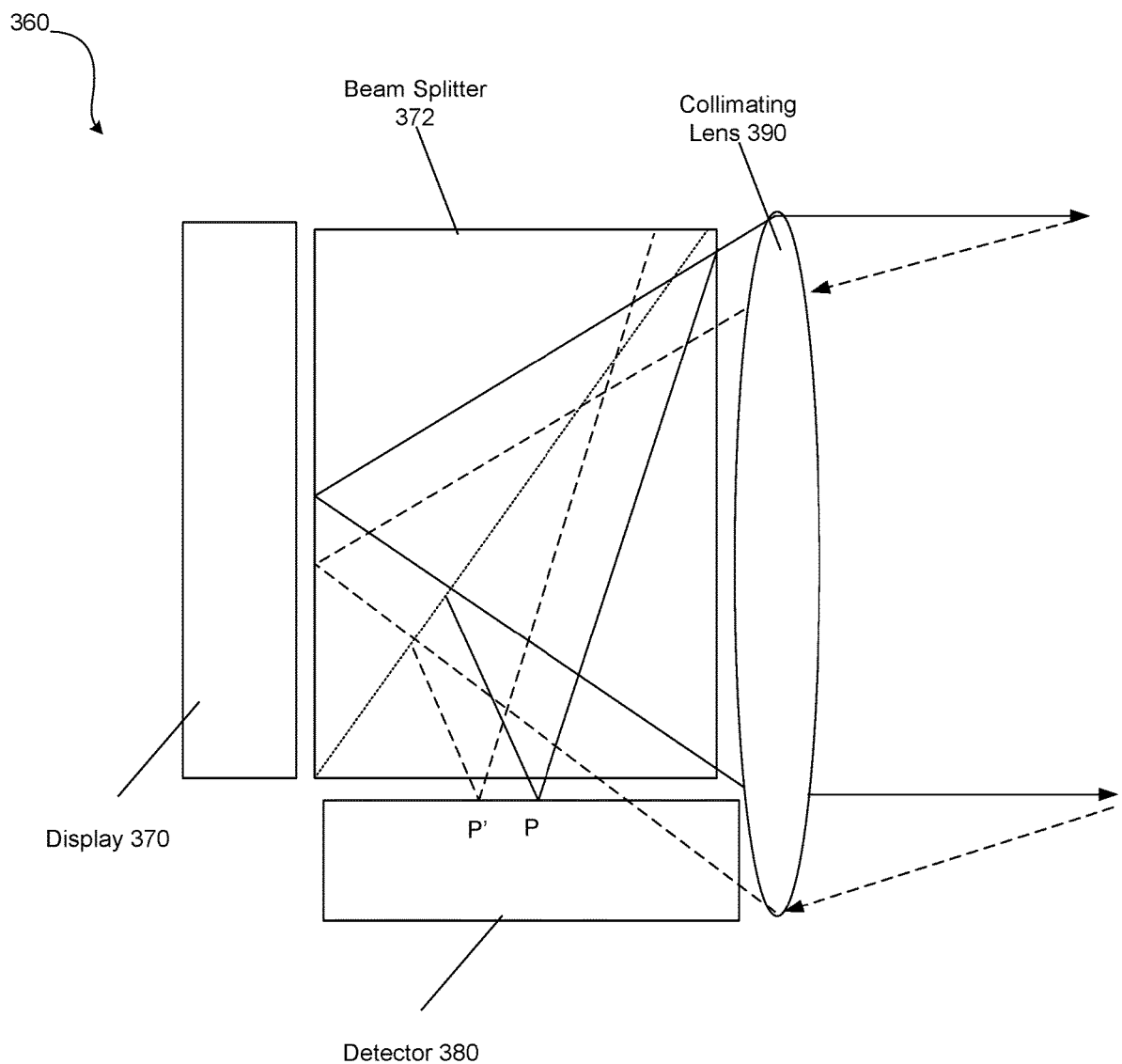

FIGS. 3A, 3B, and 3C are diagrams illustrating aspects of the technical solution described above. In each of these aspects, light is emitted from a first pixel of a display toward an incoupler of a waveguide of the smartglasses device, the first pixel being designated as a reference point for alignment calibration. If the display and waveguide are aligned, then the light reflects off the incoupler back to the first pixel. If, however, the display and waveguide are misaligned, the light reflects off the incoupler back to a second pixel. In this case, the misalignment is determined based on an offset between the first pixel and the second pixel. The pixels of the display are then shifted based on the misalignment.

FIG. 3A is a diagram illustrating a first aspect of the technical solution described above. In this aspect, the display 300 has pixels, and for each pixel in the display there are subpixels. As shown in FIG. 3A, a pixel has four subpixels. Three of the subpixels are LED or OLED emitters 310 and the remaining subpixel is used as a photodetector 320. Accordingly, if the emitters 310 are not active but the detector 320 detects light, then the light is detected as a result of a misalignment reflection off the waveguide incoupler and remedial action may be taken based on the misalignment. In some implementations, a determination of whether the light is reflected from the incoupler of the waveguide is based on a signal strength of a response of the detector 320.

In some implementations, the remedial action to be taken involves shifting the pixels of the display to compensate for the misalignment of the display and the waveguide. For example, during a calibration procedure in which the display and waveguide are verified to be aligned a pixel at P is illuminated. The pixel at P is then expected to be illuminated during every test. Nevertheless, if during use a pixel at P' is illuminated instead, then the pixels of the display are moved so that the pixel at P is illuminated. For the user, it would appear that the display has been shifted. Nevertheless, this is a better outcome than not correcting the alignment, which would result in user discomfort.

FIG. 3B is a diagram illustrating a second aspect of the technical solution described above. In this aspect, the display 330 has pixels, and for each pixel in the display there are subpixels. As shown in FIG. 3A, each subpixel has LED emitters 340. When not emitting, however, the emitters are run in read mode 350 to act as detectors rather than emitters. Again, if light is detected in read mode or at a different or unexpected location, then there is a misalignment and remedial action may be taken. In some implementations, a determination of whether the light is reflected from the incoupler of the waveguide is based on a signal strength of a response of the detectors, e.g., emitters run in read mode. In some implementations, the remedial action taken includes shifting the pixels as described above.

FIG. 3C is a diagram illustrating a third aspect of the technical solution described above. In this aspect, there is a beam splitter 372 between the display 370 and the collimating lens 390. Moreover, there is a detector 380 over which the beam splitter 372 is disposed. In this case the display 370 may be used normally as an emitter. The misalignment is detected by the detector 380 if the reflected light is incident at P' rather than P. That is, the detection of a misalignment occurs if processing circuitry receives an indication that the detector 380 has received the light at an unexpected location. In some implementations, the beam splitter 372 is placed between the collimating lens 390 and the waveguide. In some implementations, a determination of whether the light is reflected from the incoupler of the waveguide is based on a signal strength of a response of the detector 380.

In any of the aspects in FIG. 3A, 3B, or 3C, a misalignment detection system offsets the pixels by an amount based on the location of the reflected light. For example, if pixel A emitted light and it is reflected back to pixel B, then the offset is equal to the offset from pixel B to pixel A.

In some implementations, the misalignment can be determined from phenomena other than light being detected at various positions. For example, in some implementations, a misalignment is indicated based on a deviation of an image from an expected distribution of light intensity over the image. In some implementations, a misalignment is indicated based on a change in color balance of an image from an expected color balance.

Figure 4:
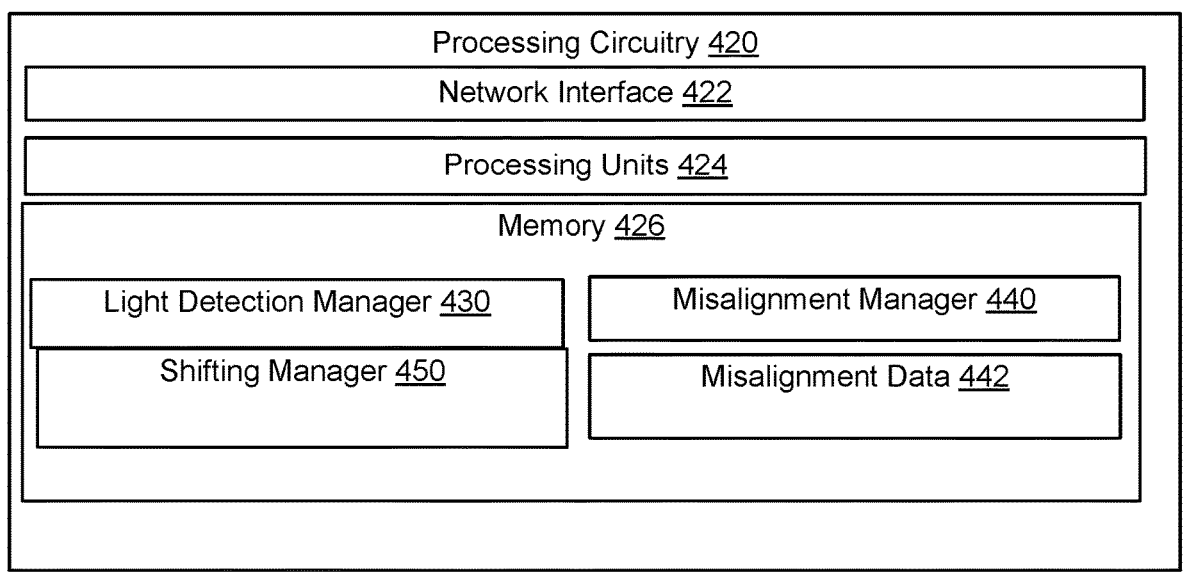
FIG. 4 is a diagram illustrating an example electronic environment in which to determine misalignment between a display and a waveguide in a smartglasses device.

FIG. 4 is a diagram illustrating an example electronic environment for determining and correcting a misalignment between a waveguide and a display of a smartglasses device, which includes processing circuitry 420. The processing circuitry 420 includes a network interface 422, one or more processing units 424, and nontransitory memory (storage medium) 426.

In some implementations, one or more of the components of the processing circuitry 420 can be, or can include processors (e.g., processing units 424) configured to process instructions stored in the memory 426 as a computer program product. Examples of such instructions as depicted in FIG. 4 include light detection manager 430, a misalignment manager 440, and a shifting manager 450. Further, as illustrated in FIG. 4, the memory 426 is configured to store various data, which is described with respect to the respective services and managers that use such data.

The light detection manager 430 is configured to emit, from a first pixel of a plurality of pixels of a display of a smartglasses device, light toward an incoupler of a waveguide of the smartglasses device, the first pixel being designated as a reference point for alignment calibration. The light detection manager 430 is also configured to detect, from a second pixel of the plurality of pixels, light reflected from the incoupler of the waveguide.

The misalignment manager 440 is configured to determine a misalignment between the display and the waveguide based on an offset between the first pixel and the second pixel. For example, in some implementations the misalignment is an angular deviation between the display and the waveguide. In some implementations, the misalignment is measured as the offset between the first pixel and the second pixel.

The shifting manager 450 is configured to shift the plurality of pixels based on the misalignment.

The components (e.g., modules, processing units 424) of processing circuitry 420 can be configured to operate based on one or more platforms (e.g., one or more similar or different platforms) that can include one or more types of hardware, software, firmware, operating systems, runtime libraries, and/or so forth. In some implementations, the components of the processing circuitry 420 can be configured to operate within a cluster of devices (e.g., a server farm). In such an implementation, the functionality and processing of the components of the processing circuitry 420 can be distributed to several devices of the cluster of devices.

The components of the processing circuitry 420 can be, or can include, any type of hardware and/or software configured to process private data from a wearable device in a split-compute architecture. In some implementations, one or more portions of the components shown in the components of the processing circuitry 420 in FIG. 4 can be, or can include, a hardware-based module (e.g., a digital signal processor (DSP), a field programmable gate array (FPGA), a memory), a firmware module, and/or a software-based module (e.g., a module of computer code, a set of computerreadable instructions that can be executed at a computer). For example, in some implementations, one or more portions of the components of the processing circuitry 420 can be, or can include, a software module configured for execution by at least one processor (not shown) to cause the processor to perform a method as disclosed herein. In some implementations, the functionality of the components can be included in different modules and/or different components than those shown in FIG. 4, including combining functionality illustrated as two components into a single component.

The network interface 422 includes, for example, wireless adaptors, and the like, for converting electronic and/or optical signals received from the network to electronic form for use by the processing circuitry 420. The set of processing units 424 include one or more processing chips and/or assemblies. The memory 426 includes both volatile memory (e.g., RAM) and non-volatile memory, such as one or more ROMs, disk drives, solid state drives, and the like. The set of processing units 424 and the memory 426 together form processing circuitry, which is configured and arranged to carry out various methods and functions as described herein.

Although not shown, in some implementations, the components of the processing circuitry 420 (or portions thereof) can be configured to operate within, for example, a data center (e.g., a cloud computing environment), a computer system, one or more server/host devices, and/or so forth. In some implementations, the components of the processing circuitry 320 (or portions thereof) can be configured to operate within a network. Thus, the components of the processing circuitry 420 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the processing circuitry 420 can be, or can include, processors configured to process instructions stored in a memory. For example, light detection manager 430 (and/or a portion thereof), misalignment manager 440 (and/or a portion thereof), and shifting manager 450 (and/or a portion thereof) are examples of such instructions.

In some implementations, the memory 426 can be any type of memory such as a random-access memory, a disk drive memory, flash memory, and/or so forth. In some implementations, the memory 426 can be implemented as more than one memory component (e.g., more than one RAM component or disk drive memory) associated with the components of the processing circuitry 420. In some implementations, the memory 426 can be a database memory. In some implementations, the memory 426 can be, or can include, a non-local memory. For example, the memory 426 can be, or can include, a memory shared by multiple devices (not shown). In some implementations, the memory 426 can be associated with a server device (not shown) within a network and configured to serve the components of the processing circuitry 420. As illustrated in FIG. 4, the memory 426 is configured to store various data, including misalignment data 442.

Figure 5:
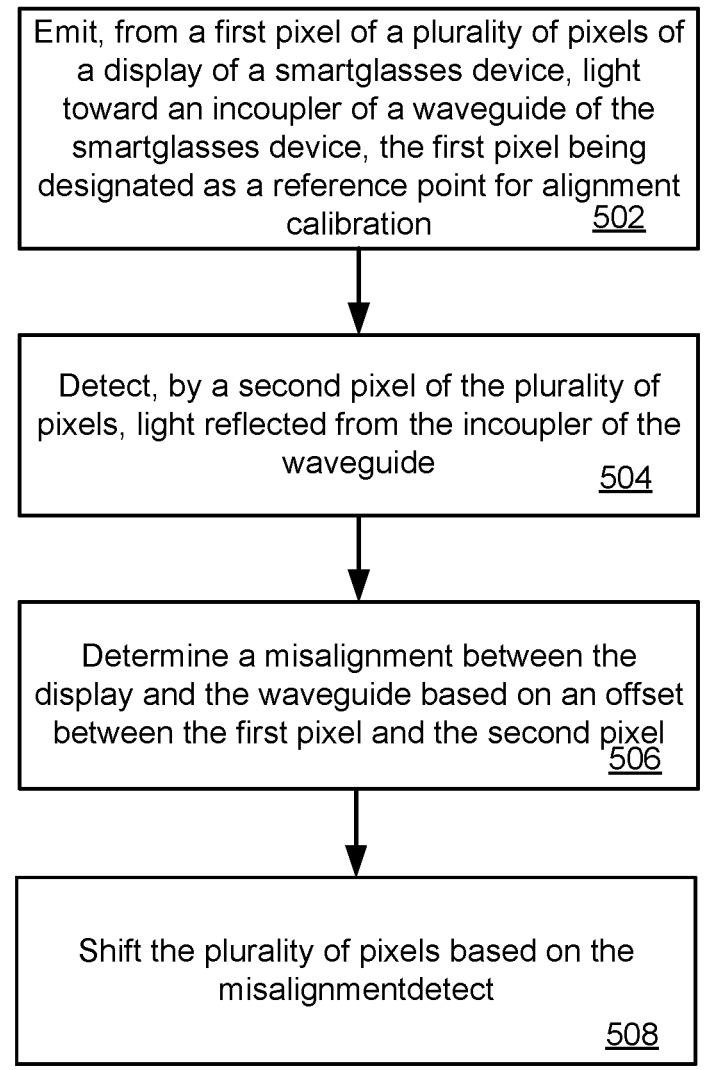
FIG. 5 is a flow chart illustrating a method of determining misalignment between display and waveguide.

FIG. 5 is a flow chart illustrating a method 500 of determining misalignment between a display and a waveguide in a smartglasses device. The method 500 may be performed by components in the processing circuitry 420 shown in FIG. 4.

At 502, the light detection manager 430 emits, from a first pixel of a plurality of pixels of a display of a smartglasses device, light toward an incoupler of a waveguide of the smartglasses device, the first pixel being designated as a reference point for alignment calibration.

At 504, the light detection manager 430 detects, from a second pixel of the plurality of pixels, light reflected from the incoupler of the waveguide.

At 506, the misalignment manager 440 determines a misalignment between the display and the waveguide based on an offset between the first pixel and the second pixel.

At 508, the shifting manager 450 shifts the plurality of pixels based on the misalignment.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method, comprising:
   emitting, from an emitter of a first pixel of a plurality of pixels of a display of a head worn device, light toward an incoupler of a waveguide of the head worn device, the first pixel having a first location in the display;
   detecting, from a second pixel of the plurality of pixels, light reflected from the incoupler of the waveguide, the second pixel being in a read mode and including an emitter configured to function as a detector that identifies a second location of the second pixel in the display;
   determining a misalignment between the display and the waveguide based on a difference between the first location and the second location; and
   shifting the plurality of pixels based on the misalignment.

2. The method as in claim 1, wherein detecting the light includes determining whether the light is reflected from the incoupler based on a signal strength of a response of the detector.

3. The method as in claim 1, wherein detecting the light includes:
   receiving an indication that a detector coupled to a beam splitter to which the display is coupled has received the light.

4. A computer program product comprising a nontransitory storage medium, the computer program product including code that, when executed by processing circuitry, causes the processing circuitry to perform a method, the method comprising:
   emitting, from an emitter of a first pixel of a plurality of pixels of a display of a head worn device, light toward an incoupler of a waveguide of the head worn device, the first pixel having a first location in the display;
   detecting, from a second pixel of the plurality of pixels, light reflected from the incoupler of the waveguide, the second pixel being in a read mode and including an emitter configured to function as a detector that identifies a second location of the second pixel in the display;
   determining a misalignment between the display and the waveguide based on a difference between the first location and the second location; and
   shifting the plurality of pixels based on the misalignment.

5. The computer program product as in claim 4, wherein detecting the light includes determining whether the light is reflected from the incoupler based on a signal strength of a response of the detector.

6. The computer program product as in claim 5, wherein detecting the light includes:
   receiving an indication that a detector coupled to a beam splitter to which the display is coupled has received the light.

7. An apparatus, the apparatus comprising:
   memory; and
   processing circuitry coupled to the memory, the processing circuitry being configured to:
      emit, from an emitter of a first pixel of a plurality of pixels of a display of a head worn device, light toward an incoupler of a waveguide of the head worn device, the first pixel having a first location in the display;
      detect, from a second pixel of the plurality of pixels, light reflected from the incoupler of the waveguide, the second pixel being in a read mode and including an emitter configured to function as a detector that identifies a second location of the second pixel in the display;
      determine a misalignment between the display and the waveguide based on a difference between the first location and the second location; and
      shift the plurality of pixels based on the misalignment.

8. The apparatus as in claim 7, wherein the processing circuitry configured to detect the light is further configured to determine whether the light is reflected from the incoupler based on a signal strength of a response of the detector.

9. The apparatus as in claim 7, wherein the processing circuitry configured to detect the light is further configured to:
   receive an indication that a detector coupled to a beam splitter to which the display is coupled has received the light.

* * * * *